W. NORRIS.
MACHINE FOR MOLDING TUBES.
APPLICATION FILED MAY 22, 1914.

1,182,199.

Patented May 9, 1916.
2 SHEETS—SHEET 2.

WITNESSES:
M. E. Flaherty
G. E. O'Brien

INVENTOR:
Webster Norris
By
[signature]
his attorneys.

UNITED STATES PATENT OFFICE.

WEBSTER NORRIS, OF NORTH BROOKFIELD, MASSACHUSETTS, ASSIGNOR TO THE B & R RUBBER COMPANY, OF NORTH BROOKFIELD, MASSACHUSETTS, A CORPORATION OF MASSACHUSETTS.

MACHINE FOR MOLDING TUBES.

1,182,199.  Specification of Letters Patent.  Patented May 9, 1916.

Application filed May 22, 1914. Serial No. 840,341.

*To all whom it may concern:*

Be it known that I, WEBSTER NORRIS, of North Brookfield, in the county of Worcester and State of Massachusetts, a citizen of the United States, have invented a new and useful Improvement in Machines for Molding Tubes, of which the following is a specification.

Pure rubber or caoutchouc is mixed with a variety of materials for vulcanizing purposes and also with other substances to secure certain physical qualities in the resulting material.

The mixing is effected usually by a pair of rolls driven at unequal speeds to produce a grinding action so that the various constituents will become incorporated into a more or less homogeneous plastic mass, this process usually working considerable air into the mixture which should be eliminated before vulcanization in order that the finished product may not be blistered or hold the air in pockets.

In forming rubber tubes, especially where they are made of a compound comparatively low in rubber, this is particularly apt to occur.

Moreover, such tubes usually come out from the tubing machine with a more or less roughened outer surface.

The use of my tubing machine herein described has resulted in an improved product, and while I have shown therein my invention in its best form, it will be apparent that it may be otherwise embodied and it may be used in molding other plastic materials.

It will be understood by reference to the drawings, in which—

Figure 1:
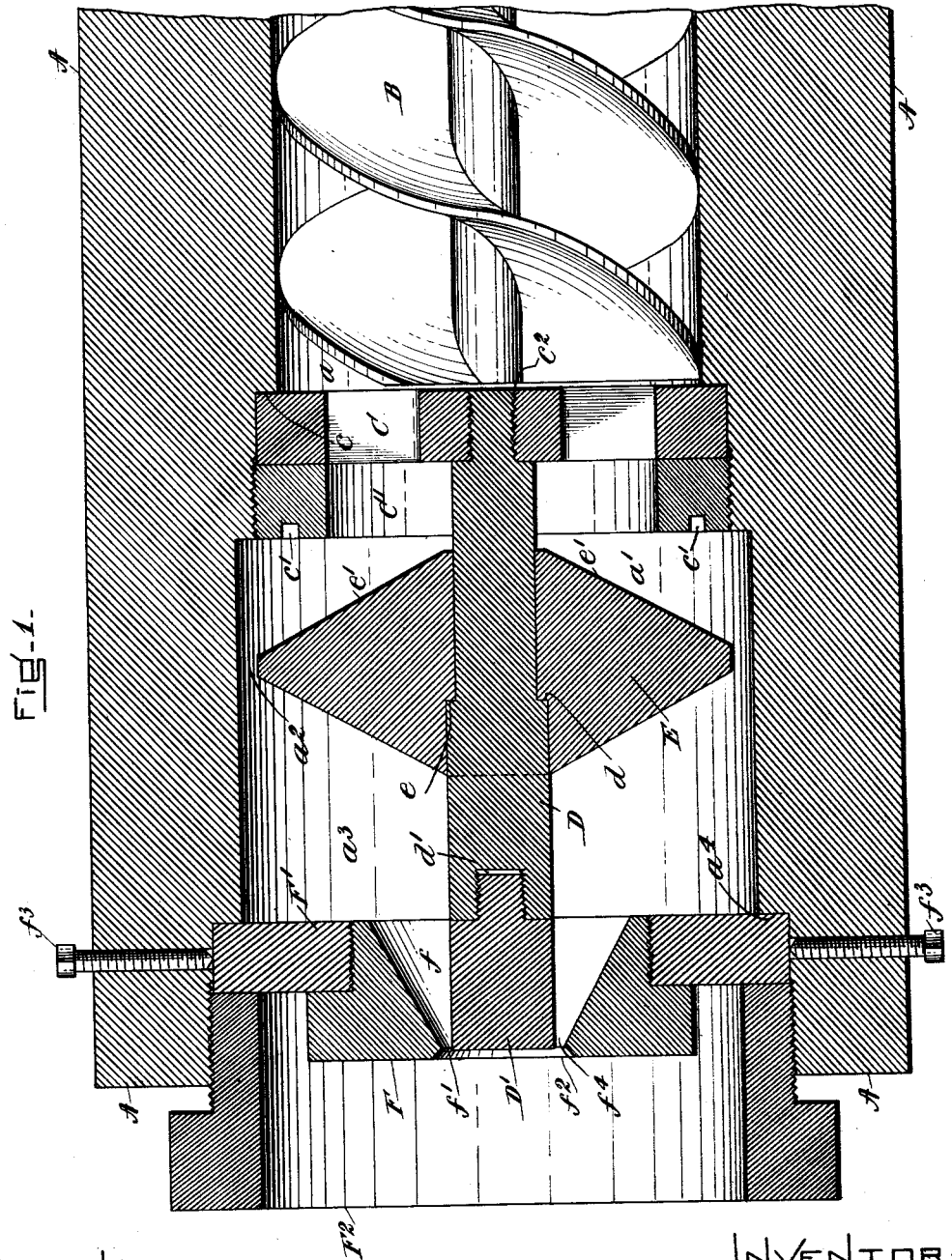
Figure 2:
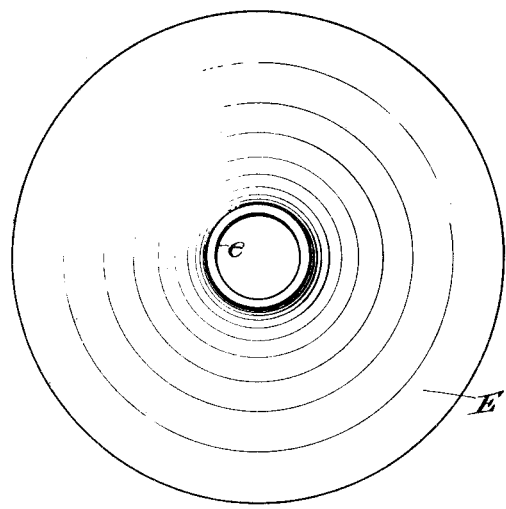
Figure 3:
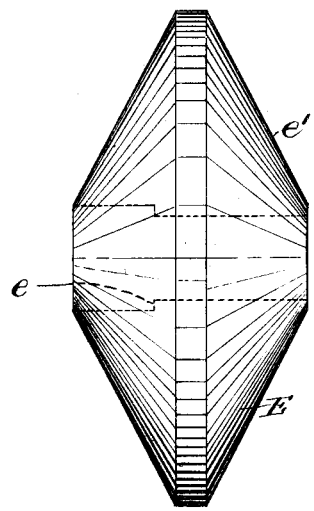
Figure 4:
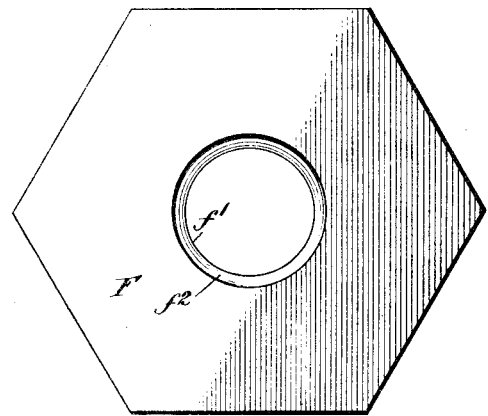
Figure 5:
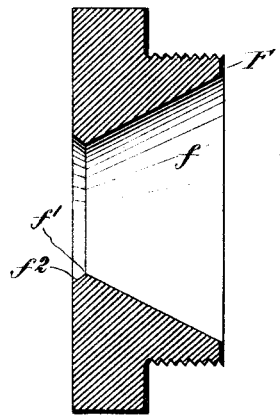

Figure 1 is a longitudinal section of the end of a tubing machine showing my improvements. Fig. 2 is a plan and Fig. 3 a side elevation of the compression collar. Fig. 4 is a plan, and Fig. 5 an enlarged section of the finishing die.

I have shown only enough the usual cylinder and feed to explain the improvement which comprises my invention, A being the cylinder of the tubing machine and B the rotating feed screw by which the gum which is put into a hopper (not shown) at the farther end of the cylinder in pressed out through the die.

Just beyond that part of the chamber $a$ which contains the screw B the diameter of the chamber $a$ is increased to form a shoulder $c$ against which a spider or bridge C is held by a screw ring $C^1$, a portion of this part of the interior being threaded for the purpose and the ring being provided with recesses $c^1$ for a spanner by which it is screwed in place.

The bridge C is provided with a central threaded opening $c^2$ into which the central spindle D screws. This spindle is of two diameters to form a shoulder as at $d$ against which the compressor collar E abuts, this collar having a central opening therethrough also of two diameters so as to form a shoulder $e$ which will engage the shoulder $d$ of the spindle. The pressure of the material passing through the machine holds the collar in place against the shoulder $d$.

The chamber $a$ is further increased in diameter to form a chamber $a^1$ of enlarged diameter partially closed by the collar E and the diameter of the collar E is so proportioned to the internal diameter of the cylinder A as to leave a comparatively narrow passage $a^2$ through which the rubber stock will be forced so as to squeeze out of it or hold back any air which may be carried through the body with the stock as well as to give it a preliminary shape. To ease the movement of the stock to the passage $a^2$ around the compression collar I prefer to make the face of the collar conical as at $e^1$ and the passage itself $a^2$ is short so that the desired result will be secured without increasing friction. It thus passes into the chamber $a^3$ which is between the collar E and the die F.

The outer end of the spindle D is provided with a threaded recess $d^1$ into which is screwed the mandrel $D^1$.

This mandrel is centered by the spindle D in a die F of peculiar construction, its peculiarity being that it provides a conical passage $f$ for the stock which terminates in an edge $f^1$ after which the passage immediately increases in diameter as at $f^2$ and ends abruptly. The finishing of the tube is therefore the result of the contact of the material with this edge $f^1$ which forms it into a tube of proper diameter and thickness and immediately the tube is freed from any further contact with the die.

The die F is held in the machine by a die holder $F^1$ into which it screws and which is held against a shoulder $a^4$ near the end of the cylinder A by the threaded binding ring F², the die holder being first centered by the set screws $f^3$ so that the passage $f^4$ between the mandrel and the edge $f^1$ will be of equal width throughout.

In the operation of this tubing machine the material is fed into the hopper and carried along by the feed screw in the chamber $a$ and then through the bridge C and the passage through the ring C¹ and around the spindle D. On striking the collar E it is pushed from behind up the incline $e^1$ to the passage $a^2$ through which it is jammed, thus acquiring a thickness approximating the thickness of the finished tube. The squeezing action upon the material as it passes through the passage $a^2$ tends to squeeze out from it any air which it may contain and hold the air back so that it will not pass into the chamber $a^3$ or if it does it will be separated from the material. From the chamber $a^3$ it is forced through the conical passage $f$ which gradually molds it as it travels until it reaches and passes the edge $f^1$ when the confining pressure is immediately reduced and the finished product comes out ready for vulcanizing.

It is evident that the compressor collar while a desirable feature need not necessarily be used in connection with the die, the die being useful with any form of tubing machine, and the collar being also useful in other machines for treating rubber or other plastic materials. Moreover, it may be supported in other ways as will occur to those skilled in the art. Nor do I mean to limit the use of my die to rubber or rubber compounds.

Other ways of constructing and combining the features of my machine will occur to those skilled in the art.

What I claim as my invention is:—

1. In a machine for treating plastic material, the combination with forcing means for feeding in the material, and an outlet at which the material is discharged, of a compressor for squeezing the air out of the plastic material, said compressor being located between said feeding means and said outlet.

2. In a machine for treating plastic material, the combination with a hollow cylinder having a chamber, of a feed screw in a portion of said chamber, a compressor collar in another portion of said chamber and concentric with said feed screw, said collar having a diameter less than said chamber so as to leave an annular aperture between the periphery of said collar and the wall of said chamber, and an outlet from said chamber, and between which outlet and feed screw said compressor collar is located.

3. In a machine for treating plastic material, the combination with a hollow cylinder having a chamber, of a feed screw in a portion of said chamber, a conical compressor collar in another portion of said chamber and concentric with said feed screw, said collar having a diameter less than said chamber so as to leave an annular aperture between the periphery of said collar and the wall of said chamber, and an outlet from said chamber and between which outlet and said feed screw said compressor collar is located.

4. In a tube molding machine, the combination with a hollow cylinder having a chamber, of forcing means in said chamber for feeding in plastic material, a die and mandrel affording an outlet from said chamber, and a compressing collar in said chamber between said forcing feeding means and said outlet.

5. In a tube molding machine, the combination with a hollow cylinder affording a chamber, a feeding screw in a portion of said chamber, a mandrel and die affording a discharge outlet from said chamber, and a compressor collar in said chamber between said feeding screw and said mandrel and die, said collar being concentric with said feeding screw and having a diameter less than the diameter of that portion of the chamber in which it is located, so as to leave an annular opening between the periphery of said collar and the wall of said chamber.

6. In a tube molding machine, the combination with a hollow cylinder affording a chamber, a feeding screw in a portion of said chamber, a mandrel and die affording a discharge outlet from said chamber, and a conical compressor collar in said chamber between said feeding screw and said mandrel and die, said collar being concentric with said feeding screw and having a diameter less than the diameter of that portion of the chamber in which it is located, so as to leave an annular opening between the periphery of said collar and the wall of said chamber.

WEBSTER NORRIS.

Witnesses:
GEORGE O. G. COALE,
M. E. FLAHERTY.